US012667053B2

(12) United States Patent
Boriack et al.

(10) Patent No.: US 12,667,053 B2
(45) Date of Patent: Jun. 30, 2026

(54) APPARATUS AND METHOD FOR ADJUSTING AN AGRICULTURAL HEADER BASED ON A SENSED CROP LOAD

(71) Applicant: CNH Industrial America LLC, New Holland, PA (US)

(72) Inventors: Cale Boriack, Lititz, PA (US); Seth Woodward, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 322 days.

(21) Appl. No.: 18/416,160

(22) Filed: Jan. 18, 2024

(65) Prior Publication Data

US 2025/0234806 A1 Jul. 24, 2025

(51) Int. Cl.
*A01D 41/14* (2006.01)
*A01D 41/127* (2006.01)
*A01D 69/03* (2006.01)

(52) U.S. Cl.
CPC ......... *A01D 41/141* (2013.01); *A01D 41/127* (2013.01); *A01D 69/03* (2013.01)

(58) Field of Classification Search
CPC .... A01D 41/141; A01D 41/127; A01D 69/03; A01D 41/145
See application file for complete search history.

(56) References Cited

U.S. PATENT DOCUMENTS

| | | | |
|---|---|---|---|
| 7,707,811 B1 * | 5/2010 | Strosser | A01D 41/141 56/10.2 E |
| 7,992,369 B2 | 8/2011 | Coers et al. | |
| 8,010,262 B2 | 8/2011 | Schroeder et al. | |
| 9,043,955 B2 * | 6/2015 | Nafziger | A01D 41/141 |
| 9,148,998 B2 | 10/2015 | Bollin et al. | |
| 10,820,511 B2 * | 11/2020 | Brimeyer | A01B 63/10 |
| 10,959,374 B2 | 3/2021 | Duerksen et al. | |
| 11,382,268 B2 | 7/2022 | Hunt et al. | |
| 11,903,342 B2 * | 2/2024 | Honeyman | A01D 61/004 |

(Continued)

FOREIGN PATENT DOCUMENTS

| | | | | |
|---|---|---|---|---|
| DE | 102022107016 A1 * | 9/2023 | | A01D 41/127 |
| EP | 2695511 A1 | 2/2014 | | |

(Continued)

OTHER PUBLICATIONS

The Extended European Search Report issued Apr. 28, 2025, by the European Patent Office in corresponding European Patent Application No. 25152538.2. (11 pages).

*Primary Examiner* — Arpad Fabian-Kovacs
(74) *Attorney, Agent, or Firm* — Buchanan Ingersoll & Rooney PC

(57) ABSTRACT

A header height control system for an agricultural vehicle includes an actuator for moving a header of the agricultural vehicle relative to a chassis of the vehicle, a sensor for detecting a crop pushing condition at the header, and a controller that receives signals from the sensor and is also operably connected to the actuator for activating the actuator. When the sensor detects the crop pushing condition and communicates the crop pushing condition to the controller, the controller is configured to activate the actuator to raise or tilt the header from a starting position and, after a predetermined amount of time has elapsed, return the header back to the starting position.

18 Claims, 1 Drawing Sheet

(56)     References Cited

U.S. PATENT DOCUMENTS

| 12,376,522 B2 * | 8/2025 | Hunt | .................... | A01D 41/141 |
| 2018/0153102 A1 * | 6/2018 | Dunn | ....................... | F15B 1/033 |
| 2020/0337233 A1 | 10/2020 | Groves | | |
| 2020/0375107 A1 | 12/2020 | Duerksen et al. | | |
| 2022/0087101 A1 | 3/2022 | Hunt et al. | | |
| 2022/0113729 A1 | 4/2022 | Vandike et al. | | |
| 2023/0172107 A1 | 6/2023 | Seiders et al. | | |
| 2024/0138302 A1 * | 5/2024 | Gahres | ................... | A01D 43/10 |

FOREIGN PATENT DOCUMENTS

| EP | 3087819 A2 | 11/2016 | | |
| EP | 3210447 A1 * | 8/2017 | ........... | A01D 41/141 |
| WO | WO-2015000920 A1 * | 1/2015 | ............. | A01F 29/10 |

* cited by examiner

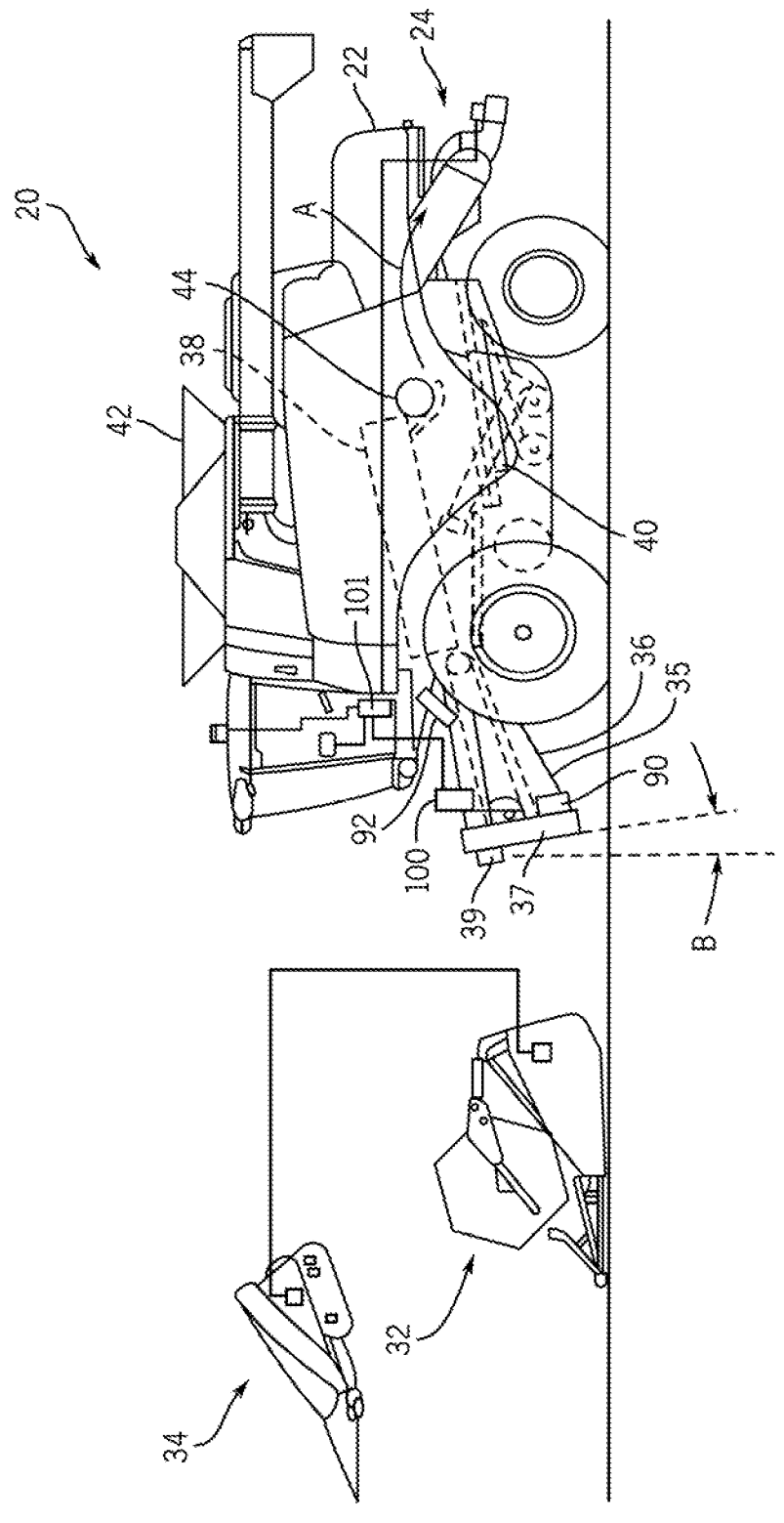

APPARATUS AND METHOD FOR ADJUSTING AN AGRICULTURAL HEADER BASED ON A SENSED CROP LOAD

FIELD OF THE INVENTION

The present invention relates to agricultural equipment, such as a combine harvester. More specifically, the present invention relates to an apparatus and method for sensing a load of a feeder of the harvester and adjusting the header based upon the sensed crop load.

BACKGROUND OF THE INVENTION

When harvesting using a combine harvester, most operators are vigilant to ensure that a header of the combine does not push the crop across the field thereby creating crop piles in the field. Pushing crop occurs when the ground and roots of the crop give way, but the crop is not transported into the feeder. This results in the crop being pushed into a pile in front of a cutter bar of the header. When pushing begins to occur, the operator normally deactivates the automated header height control feature, and then briefly raises and lowers the header so that the header releases the pile before the pile gets too large. Once the pile is released, the operator normally reactivates the automated header height control feature.

It would be advantageous to provide a means and method to automatically sense the aforementioned crop pushing condition (even before such a condition is sensed or identified by an operator), and use the automated header height control feature to compensate for and resolve the crop pushing condition. This would unburden the operator from having to identify the pushing condition as well as manually adjust the header height and deactivate/activate the automated header height control feature.

SUMMARY OF THE INVENTION

According to one aspect of the invention, a header height control system for an agricultural vehicle includes an actuator for moving a header of the agricultural vehicle relative to a chassis of the vehicle, a sensor for detecting a crop pushing condition at the header, and a controller that receives signals from the sensor and is also operably connected to the actuator for activating the actuator. When the sensor detects the crop pushing condition and communicates the crop pushing condition to the controller, the controller is configured to activate the actuator to raise or tilt the header from a starting position and, after a predetermined amount of time has elapsed, return the header back to the starting position.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a schematic side view of an embodiment of an agricultural harvester in the form of a combine, and two different headers that are each configured to be mounted to a feeder of the combine.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing FIGURES.

The terms "forward" (or fore), "rearward" (or rear or aft), "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream arrows shown in FIG. 1.

Referring now to the drawings, and more particularly to FIG. 1, that FIGURE depicts a self-propelled agricultural combine 20. Combine 20 has a front end to which a header 32 can be connected. Header 32 is commonly referred to as a grain header and is typically utilized for harvesting smaller grains, such as, but not limited to, wheat and soybeans. Another well-known header 34 is shown, which is a corn header. Corn header 34 can also be connected to combine 20. Headers 32 and 34, as well as other headers (not shown), are configured to be interchangeably mounted on the front end of a feeder 36 of combine 20 for configuring combine 20 to harvest a particular crop.

In operation, the crops harvested by the header will be gathered up by the header and conveyed by feeder 36 (also referred to in the art as a feederhouse) rearwardly and upwardly into the body of the combine 20, for processing by a threshing system 38. System 38 is operable for threshing and separating grain from larger elements of crop material, such as stems, leaves, cobs and larger fragments of pods, such that the grain will fall into a cleaning system 40, which will further process or clean smaller elements of crop residue from the grain, and the grain will be conveyed to a grain tank 42 or other collector. The larger elements of crop material will be propelled rearwardly through a rear end 22 of the body of combine 20 by a rapidly rotating beater 44, and into an inlet opening of a spreader 24, as generally denoted by arrow A, in FIG. 1. Further details of combine 20 may be described in U.S. Pat. No. 8,010,262 to Blue Leaf IP Inc. (the '262 patent), which is incorporated by reference in its entirety and for all purposes. It is noted, however, that combine 20 of FIG. 1 departs from the combine shown in the '262 patent.

Feeder 36 includes a feeder body 35 having a hollow interior for receiving crop material from the header 32/34. A faceplate 37 is mounted to the forward end of the feeder body 35. Headers 32 and 34 are interchangeably attached to faceplate 37 on the free end of feeder 36. Specifically, headers 32/34 include couplers for releasably mounting to a coupling on faceplate 37.

The combine 20 includes actuator 92 for tilting the entire feeder 36 (including the header 32/34 attached thereto)

relative to the chassis of the combine in the fore and aft directions. The actuator 92 may be a piston-cylinder arrangement, a motor, or a solenoid. The actuator 92 may be powered hydraulically, mechanically or electrically, for example. In view of all of the different devices described herein that may be used to rotate (or otherwise move) feeder 36 with respect to the chassis of the combine, actuator 92 may be generally referred to herein as a "means for moving" the feeder 36.

The combine 20 may also include an actuator 90 for moving faceplate 37 with respect to the feeder body 35 along angle "B." For example, a piston-cylinder arrangement, a motor, a solenoid, or a scissor jack assembly may be configured to rotate faceplate 37 with respect to the feeder body. The motor may be powered electrically or hydraulically, for example.

Turning now to the details of the header height control system of the combine 20, the header height control system receives ground height measurements from ground height sensors located along the header 32/34. Each height sensor provides a signal representative of a measurement of the height of the header above the ground at the location of the respective sensor. The ground height sensors may comprise ultrasonic, optical or radar rangefinders. The ground height sensors also may comprise mechanical rangefinders, such as a mechanical drag arm (i.e., feeler) or drag wheel that is connected to the header by a linear or angular potentiometer to measure distance as a function of changing resistance of the potentiometer, such as known in the art.

The header height control system 100 processes the signals from the ground height sensors to decide how to position the header relative to the ground. Importantly, the header height control system 100 also receives signals from a load sense system 39. When the signals transmitted by the load sense system 39 indicate that a crop pushing condition exists, the header height control system will automatically operate the actuator 92 and/or 90 to raise and/or tilt the feeder (and the header connected thereto) so that the header 32/34 releases the crop pile. The feeder will be raised or tilted for a predetermined amount of time (e.g., less than 5 seconds) and then returned to its initial position. A crop pushing condition may exist, for example, when the detected load on the header applied by the crops on the ground exceeds a pre-determined threshold value. A crop pushing condition may also exist, for example, when the detected load on the header applied by the ground exceeds a pre-determined threshold value.

Turning now to the features of the load sense system 39 of the header height control system 100, the load sense system 39 is configured for automatically sensing a crop pushing condition (even before such a condition is sensed or identified by an operator), and communicating that condition to a controller 101 of the header height control system so that the header height control system can compensate for and resolve the crop pushing condition. The controller may be uniquely designed for the header height control system or the controller may be a general computer controller of the combine.

More particularly, to sense the crop pushing condition, the load sense system 39 is installed on the header 32/34, feeder 36, and/or actuator 92 to measure the force applied onto the header by the ground as well as the crops being pushed along the ground by the header. It should be understood that the load sense system 39 may be installed on the feeder 36 because the same ground force is ultimately transmitted to the faceplate 37 of the feeder 36 due to the interconnection between the header and the feeder. And, the load sense system 39 may be installed on the actuator 92 because that same force is also transmitted through the actuator 92 for tilting the feeder 36 in the fore-aft directions.

The load sense system 39 may comprise load cells, which may be referred to more generally as force sensors. The load cells may be positioned (i) on the faceplate 37 (as shown), (ii) either on or within the piston-cylinder arrangement 92, (iii) on the header 32/34, and/or (iv) on the cutter bar of the header 32/34. Alternatively, the load sense system may be able to identify a crop pushing condition through optical means as opposed to relying on force measurements.

The header height control system of the combine 20 accounts for the load/force readings provided by the aforementioned load cells of the load cell system 39, and, as a crop pile starts to build on the cutter bar or other component of the header, the load cells sense the increased force associated with the crop pushing condition. Once the force exceeds a threshold value, the software of the header height control system is configured to either lift or tilt the feeder 36 during harvesting so that the header 32/34 releases the crop pile. This automated feature would reduce operator fatigue and improve operation as this system prevents the crop pushing condition before the operator becomes aware of the condition. The automated feature would unburden the operator from having to manually identify the crop pushing condition as well as manually adjust the header height and deactivate/activate the automated header height control feature.

Further details of the header height control system (without the load sense system 39) may be found in U.S. Pat. No. 11,382,268, which is incorporated by reference herein in its entirety.

It is to be understood that the operational steps described above are performed by a computer controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein is implemented in software code or instructions which are tangibly stored on a tangible computer readable medium. Upon loading and executing such software code or instructions by the controller, the controller may perform any of the functionality of the controller described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A header height control system of an agricultural vehicle, the header height control system comprising:

an actuator directly connected to a feederhouse of the agricultural vehicle, wherein the agricultural vehicle comprises a chassis and a header being releasably connected to the feederhouse such that the feederhouse and header move together, and wherein the actuator moves the feederhouse along with the header relative to the chassis of the agricultural vehicle;

a sensor that detects a crop pushing condition at the header; and a controller that receives signals from the sensor and is also operably connected to the actuator, wherein when the sensor detects the crop pushing condition and communicates the crop pushing condition to the controller, the controller activates the actuator that raises or tilts the feederhouse along with the header from a starting position such that the header releases a crop pile causing the crop pushing condition and, after a predetermined amount of time has elapsed, returns the feederhouse along with the header back to the starting position.

2. The header height control system of claim 1, wherein the sensor comprises a load cell.

3. The header height control system of claim 1, wherein the actuator comprises a piston and cylinder arrangement.

4. The header height control system of claim 3, wherein the sensor is positioned either on the piston, within the cylinder or is in fluid communication with fluid contained within the cylinder.

5. The header height control system of claim 1, wherein the sensor is positioned on the header in detecting a crop pushing condition at the header.

6. The header height control system of claim 1, wherein the sensor is positioned on a cutter bar of the header in detecting a crop pushing condition at the header.

7. The header height control system of claim 1, wherein the sensor detects a crop pushing condition at the header when a force applied onto the header by crops on the ground exceeds a pre-determined value.

8. The header height control system of claim 7, wherein the force is measured at a faceplate of the feederhouse of the vehicle, the actuator, a fluid that powers the actuator, or a cutter bar of the header.

9. The header height control system of claim 7, wherein the force is measured at a faceplate of the feederhouse of the vehicle, and wherein the faceplate is sandwiched between the feederhouse of the vehicle and the header.

10. The header height control system of claim 9, wherein the sensor is positioned between the faceplate and the header.

11. The header height control system of claim 1, wherein the sensor comprises an optical sensor for visually detecting the crop pushing condition.

12. The header height control system of claim 1, wherein the predetermined amount of time is less than five seconds.

13. An agricultural vehicle comprising a chassis, a header, a feederhouse and the header height control system of claim 1 in controlling a position of the feederhouse and the header relative to the chassis.

14. A combine harvester comprising the header height control system of claim 1.

15. A method of operating a header height control system of an agricultural vehicle, the method comprising:

detecting a crop pushing condition at a header of the agricultural vehicle using a sensor, wherein the agricultural vehicle comprises a chassis, a feederhouse, and the header being releasably connected to the feederhouse such that the feederhouse and header move together; and in response to detecting the crop pushing condition by the sensor, activating an actuator that raises or tilts the feederhouse along with the header from a starting position such that the header releases a crop pile causing the crop pushing condition and, after a predetermined amount of time has elapsed, re-activating the actuator that returns the feederhouse along with the header back to the starting position.

16. The method of claim 15, wherein the detecting comprises measuring a force applied by pushed crop onto a faceplate of the feederhouse, and wherein the faceplate is sandwiched between the feederhouse and the header.

17. The method of claim 16, wherein the sensor is positioned between the faceplate and the header.

18. The method of claim 16, wherein the activating comprises activating the actuator that raises and tilts the feederhouse.

* * * * *